United States Patent Office 3,575,915
Patented Apr. 20, 1971

3,575,915
DENTURE ADHESIVE COMPOSITIONS
Leo Novak, Union, and Ling Wei and Robert Marchisotto, East Brunswick, N.J., assignors to Schering Corporation, Bloomfield, N.J.
No Drawing. Filed May 26, 1969, Ser. No. 827,934
Int. Cl. A61c 13/10
U.S. Cl. 260—29.6
9 Claims

ABSTRACT OF THE DISCLOSURE

Disclosed herein is a superior denture adhesive composition comprising polyvinyl acetate, water, ethanol, a mineral hydrocolloid and a plasticizer.

---

This invention relates to novel composition of matters which afford a significant advance in the denture adhesive art. The closest prior art denture adhesive composition known to applicants is a widely-used commercial product containing only polyvinyl acetate, ethanol and a minor amount of a dioctyl phthalate plasticizer.

This prior are composition suffers several major drawbacks. It is a highly viscous product and not easily extrudable from the conventional tube package, thus rendering it relatively difficult to apply to the denture. Moreover, while in the denture wearers mouth it slowly and non-uniformly hardens, swells and wrinkles during the prolonged contact with water and saliva. This hardening starts from the interface of the gum and adhesive composition and slowly continues toward the interface of the adhesive composition and denture. In the normal course of use, the denture wearer removes the denture (generally made of polymethacrylate) for cleaning before this hardening is completed. The soft layer adjacent to the denture tends to tenaciously adhere to the denture surface and usually must be removed in a tedious piecemeal fashion.

We have now discovered a novel composition that overcomes the foregoing disadvantages while still retaining the desired degree of denture adhesion and stability. This composition comprises polyvinyl acetate, water, ethanol and minor amounts of both a plasticizer for said polyvinyl acetate and a mineral hydrocolloid. The water and ethanol components are each present in an amount of 25–65% by weight based on the weight of the polyvinyl acetate.

The composition of this invention strike the right balance of cohesive and adhesive properties such that they can be readily stripped off the denture when cleaning is desired, yet are sufficient adhesive to hold the dentures in place under normal conditions of wear.

These novel compositions are also less viscous and are more readily extrudable from the conventional collapsible tube package than the aforesaid prior art product. Moreover, they have greater physical dimensional stability on exposure to moisture and saliva and have better storage stability.

The polyvinyl acetate component preferably has a viscosity in the range of 10 to 25 centipoise. In a preferred embodiment the polyvinyl acetate component has a viscosity of about 15 centipoise. This component should constitute between about 35% and 70% by weight of the composition. Preferably the polyvinyl acetate component comprises 40 to 60% by weight of the adhesive composition.

The water and ethanol components are each present in an amount of at least 20% and not more than 70% by weight of the weight of the polyvinyl acetate component, and preferably between about 40 and 60% by weight of the polyvinyl acetate component. In a preferred embodiment the water and ethanol components are each present in approximately equal amounts by weight.

Suitable hydrophilic colloid components (also referred to as hydrocolloids) are well known in the art and are exemplified by the colloidal silicates. Such colloidal silicates are inorganic and have a specific surface area greater than about 25 square meters per gram. The aluminosilicates are the preferred class of hydrocolloids for the compositions of this invention and magnesium aluminum silicate, either naturol or synthetic, is the hydrocolloid of particular choice. The hydrophilic colloid component should be present in the adhesive composition in an amount of from about 1 to 15% by weight, and preferably 2 to 8%.

Suitable plasticizer for polyvinyl acetate are well known in the art. Exemplary of these are the dialkyl phthalate esters, and particularly the dioctyl phthalates such as di-2-ethylhexylphthalate. Other acceptable plasticizers are the high molecular weight fatty acid esters such as ethyl stearate and butyl stearate. In a particularly preferred embodiment the plasticizer comprises glyceride esters of fatty acids. We have found that these glycerides esters serve not only as plasticizers but also act as denture release promoting agents.

As a variant within the scope of this invention, the instant compositions can also contain a small amount of an extraneous hydrophobic release agent to further aid in easy removal of the adhesive composition from the denture. The compositions of this invention have the added advantage of being able to tolerate such hydrophobic release agents without detrimental effect to the product extrudability or stability. Generally these materials should be present in an amount less than about 5% by weight based on the weight of the adhesive composition. Mineral oil is exemplary of such hydropholic release agents.

If desired, a small amount of a dye can be incorporated into the compositions of this invention. Of course, all the components of the denture adhesive compositions of this invention should be non-toxic and without objectionable taste including any dyes, plasticizers, mineral hydrocolloids and hydrophobic release agents.

The compositions of this invention can be prepared by mixing the polyvinyl acetate and ethanol (and dye, if any) and adding thereto a homogeneous mixture of the mineral hydrocolloid in water. The combined mixture is stirred until it is homogeneous. If a separate hydrophobic release agent is employed it can then be added and the entire mixture is further stirred until it is homogeneous.

The following example illustrates a representative denture adhesive composition of this invention. All parts are by weight unless otherwise specified.

EXAMPLE 46 parts of polyvinyl acetate having a viscosity of 15 centipoise are added to 23 parts of ethanol in a Baker-Perkins mixer and then the mixture is stirred. In a separate container 5 parts of colloidal magnesium aluminum silicate are added to 23 parts of distilled water and the mixture is stirred rapidly until homogeneous. This solution is added to the ethanol-polyvinyl acetate mixture and then stirred until homogeneous. Three parts of a commercial mixture of mono- and diglyceride esters of fatty acids (Atmos 300) are added. As indicated in the October 1967 Product Information Bulletin of Atlas Chemical Industries, Inc., Wilmington, Dela., Atmos 300 is a mixture of mono and diglycerides of fat-forming fatty acids having the following characteristics:

Total monoglycerides: approx. 57%
Specific gravity (a) 25° C.: approx. 0.96
Viscosity (a) 25° C.: approx. 150 cps.
Hydrophile-lipophile balance rating 2.8

The combined ingredients are stirred until homogeneous. This mixture has good rheological properties, good stability and can be applied to dentures to provide good adhesion and ready removability when desired.

The denture adhesive compositions of this invention can be packaged in conventional collapsible tubes and dispensed therefrom by manual pressure. Alternatively those compositions can be packaged in the inner collapsible casing of a pressurized dispenser of the type described in Miskel et al. U.S. Pat. 3,181,735 and dispensed therefrom by propellant pressure.

Numerous other variations of the above denture adhesive compositions will be apparent to the one skilled in the art within the spirit of the present invention.

We claim:

1. A denture adhesive composition comprising polyvinyl acetate, water and ethanol, said water and ethanol each being present in an amount of 20-70% by weight based on the weight of said polyvinyl acetate, and 1-15% by weight of a mineral hydrocolloid and a plasticizing amount of a plasticizer for said polyvinyl acetate.

2. A denture adhesive composition according to claim 1 wherein the polyvinyl acetate comprises 40-60% by weight of said composition.

3. A denture adhesive composition according to claim 1 wherein the water and ethanol components are each present in an amount of 40-60% by weight based on the weight of said polyvinyl acetate.

4. A denture adhesive composition according to claim 1 wherein the water and ethanol components are each present in approximately equal amounts by weight.

5. A denture adhesive composition to claim 1 wherein said mineral hydrocolloid is a colloidal silicate.

6. A composition according to claim 1 which additionally contains a hydrophobic release agent.

7. A composition according to claim 6 wherein the hydrophobic release agent is mineral oil.

8. A composition according to claim 1 wherein said mineral hydrocolloid is present an amount of 2-8% by weight.

9. A composition according to claim 8 wherein the polyvinyl acetate comprises 40-60% by weight of said composition, the water and ethanol components are each present in approximately equal amounts by weight, said mineral hydrocolloid is a colloidal silicate, and said composition additionally contains mineral oil.

References Cited

UNITED STATES PATENTS

| 2,459,955 | 1/1949 | Morrison et al. | 270—17 |
| 2,467,340 | 4/1949 | Seymour | 260—41 |

DONALD E. CZAJA, Primary Examiner

D. J. BARRACK, Assistant Examiner

U.S. Cl. X.R.

32—2; 106—35; 260—23, 31.2, 31.8, 33.4, 33.6, 41